United States Patent
Shimosato

(10) Patent No.: US 12,170,846 B2
(45) Date of Patent: Dec. 17, 2024

(54) ELECTRONIC APPARATUS AND METHOD FOR CONTROLLING ELECTRONIC APPARATUS, THAT DISPLAYS FOCAL DISTANCE AND IMAGE-RELATED INFORMATION BASED ON NEW DETECTION OF AN OBJECT APPROACHING THE FINDER

(71) Applicant: CANON KABUSHIKI KAISHA, Tokyo (JP)

(72) Inventor: Jiro Shimosato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 17/990,935

(22) Filed: Nov. 21, 2022

(65) Prior Publication Data

US 2023/0084919 A1    Mar. 16, 2023

Related U.S. Application Data

(63) Continuation of application No. PCT/JP2021/013966, filed on Mar. 31, 2021.

(30) Foreign Application Priority Data

May 26, 2020   (JP) ................. 2020-091338

(51) Int. Cl.
*H04N 23/67* (2023.01)
*H04N 23/68* (2023.01)
(Continued)

(52) U.S. Cl.
CPC ............ *H04N 23/67* (2023.01); *H04N 23/68* (2023.01); *H04N 23/69* (2023.01); *H04N 23/80* (2023.01); *H04N 23/81* (2023.01)

(58) Field of Classification Search
CPC ........ H04N 23/67; H04N 23/68; H04N 23/69; H04N 23/80; H04N 23/81; H04N 23/675;
(Continued)

(56) References Cited

U.S. PATENT DOCUMENTS

| | | | |
|---|---|---|---|
| 2012/0033127 A1* | 2/2012 | Uenishi | H04N 23/635 348/E5.045 |
| 2016/0169956 A1* | 6/2016 | Kim | G01R 31/68 307/125 |

(Continued)

FOREIGN PATENT DOCUMENTS

| | | |
|---|---|---|
| JP | 2001005087 A | 1/2001 |
| JP | 2004-023538 A | 1/2004 |

(Continued)

OTHER PUBLICATIONS

The foreign references 1-8 were cited in the International Search Report dated Jun. 22, 2021 of International Application No. PCT/JP2021/013966, which is enclosed.

(Continued)

*Primary Examiner* — Gevell V Selby
(74) *Attorney, Agent, or Firm* — Cowan, Liebowitz & Latman, P.C.

(57) ABSTRACT

An electronic apparatus includes: a processor; and a memory storing a program which, when executed by the processor, causes the electronic apparatus to: receive an instruction to perform image capturing preparation processing; control to display a captured image which is captured by an image pickup element but not to display a first item to indicate setting information related to image capturing and a second item to indicate information related to a result of the image capturing preparation processing, on a display, in a case of a first state including a state of not receiving the instruction; and control to display, 1) the second item at a position corresponding to the result of the image capturing prepara- (Continued)

tion processing and 2) the first item, along with the captured image, on the display, in a case where the instruction is received.

16 Claims, 8 Drawing Sheets

(51) Int. Cl.
　　　H04N 23/69　　　(2023.01)
　　　H04N 23/80　　　(2023.01)
　　　H04N 23/81　　　(2023.01)
(58) Field of Classification Search
　　　CPC .. H04N 23/632; H04N 23/633; H04N 23/634;
　　　　　　　　　　　　G03B 17/02; G03B 17/18; G03B 17/20
　　　See application file for complete search history.

(56) References Cited

U.S. PATENT DOCUMENTS

| | | | | |
|---|---|---|---|---|
| 2018/0139387 A1* | 5/2018 | Shoda | .................. | H04N 23/651 |
| 2018/0234631 A1* | 8/2018 | Takagi | .................. | H04N 23/675 |
| 2019/0191101 A1* | 6/2019 | Ogawa | .................. | H04N 23/635 |
| 2021/0297586 A1* | 9/2021 | Imai | ..................... | H04N 23/635 |

FOREIGN PATENT DOCUMENTS

| | | |
|---|---|---|
| JP | 2004-363954 A | 12/2004 |
| JP | 2005-167701 A | 6/2005 |
| JP | 2007-178735 A | 7/2007 |
| JP | 2008-244789 A | 10/2008 |
| JP | 2008-294972 A | 12/2008 |
| JP | 2010041598 A | 2/2010 |
| JP | 2016127498 A | 7/2016 |
| JP | 2017-038246 A | 2/2017 |
| JP | 2018-036802 A | 3/2018 |
| JP | 2019-071507 A | 5/2019 |
| WO | 2016/031657 A1 | 3/2016 |

OTHER PUBLICATIONS

Feb. 27, 2024 Japanese Office Action, which is enclosed without an English Translation, that issued in Japanese Patent Application No. 2020-091338.

The above foreign patent documents were cited in the Jul. 23, 2024 Japanese Office Action, which is enclosed without an English Translation, that issued in Japanese Patent Application No. 2020-091338.

* cited by examiner

FIG. 8

| ITEM | DURING STANDBY | AFTER IMAGE CAPTURING PREPARATION INSTRUCTION/ DURING PRE-REC | DETAILS |
|---|---|---|---|
| EXPOSURE CORRECTION | NO DISPLAY | DISPLAY | SEE ITEM 602 |
| BATTERY | DISPLAY | DISPLAY | SEE BATTERY ITEM 401 |
| NUMBER OF CAPTURABLE IMAGES | NO DISPLAY | DISPLAY | SEE ITEM 601 |
| RECORDABLE TIME OF MOVING IMAGE | DISPLAY(*) | DISPLAY | SEE ITEM 705 (*) NORMALLY NOT DISPLAYED. CONSTANTLY DISPLAYED IN RED WHEN 00:00:00. CONSTANTLY DISPLAYED DURING MOVING IMAGE RECORDING. |
| FOCAL DISTANCE | DISPLAY(*) | DISPLAY | SEE FOCAL DISTANCE ITEM 602 (*) NORMALLY NOT DISPLAYED. DISPLAYED FOR A PREDETERMINED TIME WHEN THE FOCAL DISTANCE IS CHANGED OR EYE APPROACH IS DETECTED. |
| AF SYSTEM | NO DISPLAY | DISPLAY | |
| Bluetooth | NO DISPLAY | DISPLAY | |
| Wi-Fi | DISPLAY(*) | DISPLAY | (*) NORMALLY NOT DISPLAYED. FLASHING MARK IS DISPLAYED WHEN CONNECTION ERROR OCCURRED. |
| RADIO WAVE | NO DISPLAY | DISPLAY | |
| TEMPERATURE WARNING | DISPLAY | DISPLAY | |
| MOVING IMAGE HEAT RESTRICTION | DISPLAY | DISPLAY | |
| ●REC | NO DISPLAY | DISPLAY(*) | SEE ITEM 711. (*) DISPLAYED DURING MOVING IMAGE RECORDING |
| MOVING IMAGE BUFFER | NO DISPLAY | DISPLAY(*) | SEE ITEM 712. (*) DISPLAYED DURING MOVING IMAGE RECORDING |

ELECTRONIC APPARATUS AND METHOD FOR CONTROLLING ELECTRONIC APPARATUS, THAT DISPLAYS FOCAL DISTANCE AND IMAGE-RELATED INFORMATION BASED ON NEW DETECTION OF AN OBJECT APPROACHING THE FINDER

CROSS-REFERENCE TO RELATED APPLICATIONS

This application is a Continuation of International Patent Application No. PCT/JP2021/013966, filed Mar. 31, 2021, which claims the benefit of Japanese Patent Application No. 2020-091338, filed May 26, 2020, both of which are hereby incorporated by reference herein in their entirety.

BACKGROUND OF THE INVENTION

Field of the Invention

The present invention relates to an electronic apparatus, and more particularly to a technique to display information along with a live view image.

Background Art

Some electronic apparatuses display a focus position during image capturing and information related to the image capturing in the live view image. PTL 1 discloses that in a state where an eye of a user is viewing a finder in which a live view image is displayed, the user can move an AF frame by touch operation, and focusing processing is performed based on the moved AF frame when image capturing is instructed. Further, PTL 2 discloses that setting related to image capturing is displayed before capturing an image, and a user can change the setting of the image capturing while checking the displayed set values.

In PTL 1 and PTL 2, when the user is viewing the live view image not to capture an image but to view a subject, the displayed items, which are superimposed on the live view image, may drop visibility. If an AF frame and the information related to image capturing are not displayed, however, the user must capture an image without knowing the focal point and the setting on the image capturing, that is, operability is diminished.

CITATION LIST

Patent Literature

PTL 1 Japanese Patent Application Publication No. 2018-036802
PTL 2 Japanese Patent Application Publication No. 2019-071507

SUMMARY OF THE INVENTION

With the foregoing in view, it is an object of the present invention to improve both the operability when an image is captured and the visibility of the live view image.

An aspect of the present invention is an electronic apparatus including: a processor; and a memory storing a program which, when executed by the processor, causes the electronic apparatus to: receive an instruction to perform image capturing preparation processing; control to display a captured image which is captured by an image pickup element but not to display a first item to indicate setting information related to image capturing and a second item to indicate information related to a result of the image capturing preparation processing, on a display, in a case of a first state including a state of not receiving the instruction; and control to display, 1) the second item at a position corresponding to the result of the image capturing preparation processing and 2) the first item, along with the captured image, on the display, in a case where the instruction is received.

Further features of the present invention will become apparent from the following description of exemplary embodiments with reference to the attached drawings.

BRIEF DESCRIPTION OF THE DRAWINGS

FIG. 8 is a table indicating the display/non-display of items according to an embodiment.

DESCRIPTION OF THE EMBODIMENTS

Embodiments of the present invention will be described with reference to the drawings.

<Embodiments> (Configuration of Electronic Apparatus)

Figure 1A:
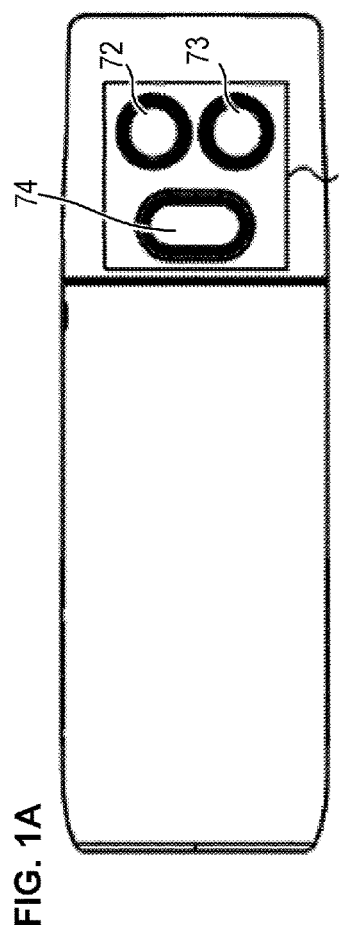
FIGS. 1A to 1D are external views of an electronic apparatus according to an embodiment.
Figure 1D:
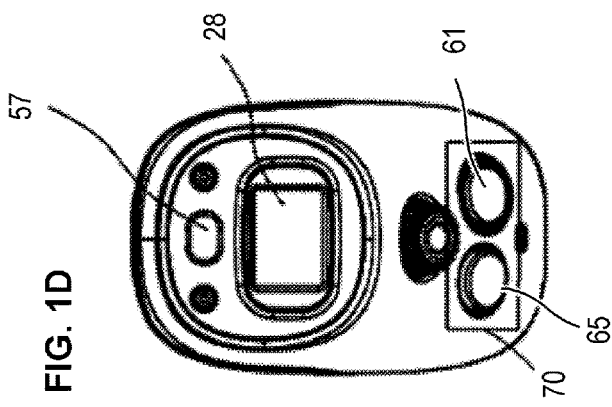
Figure 1C:
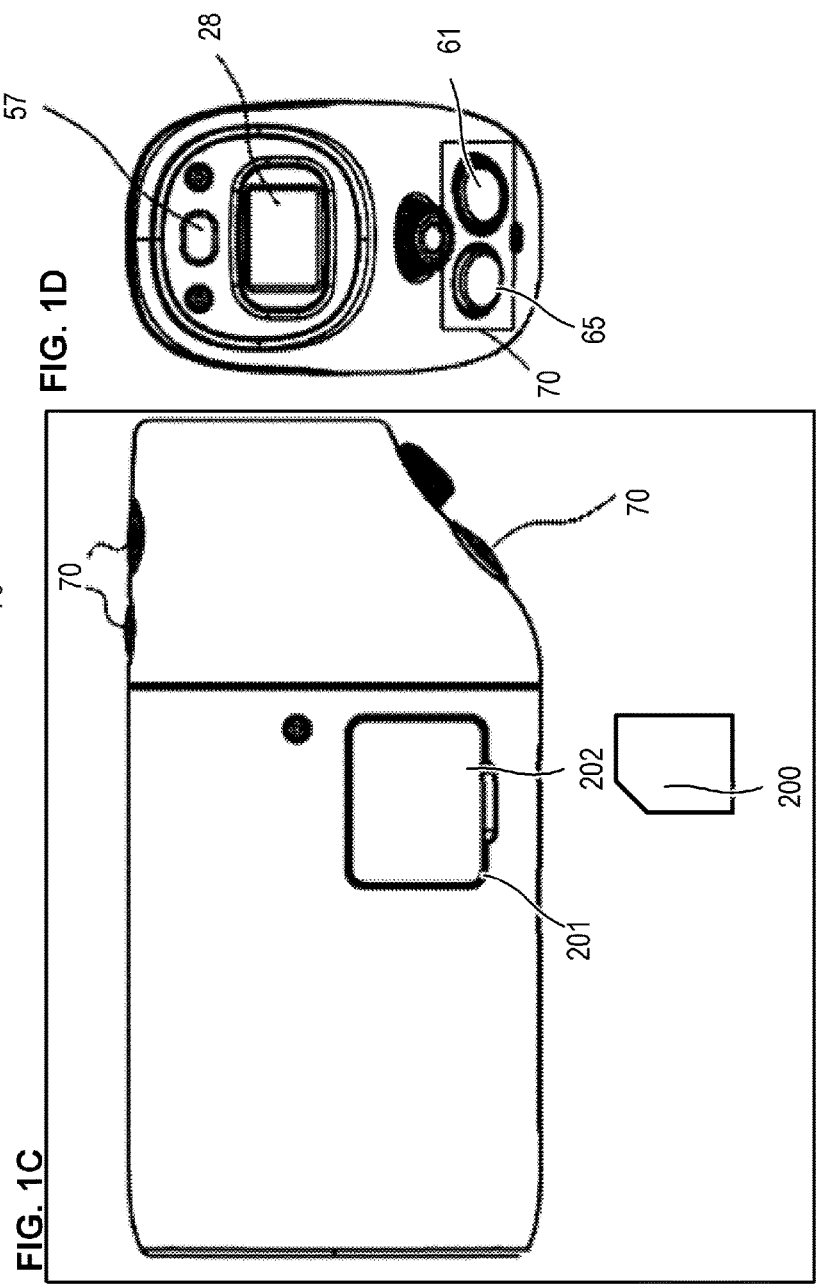
Figure 1B:
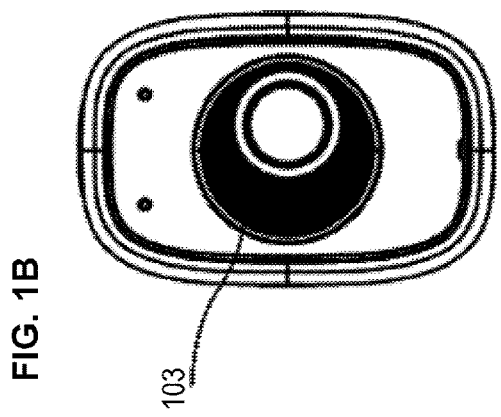

A configuration of an electronic apparatus 100 according to an embodiment will be described first, with reference to FIGS. 1A to 1D and FIG. 2. FIGS. 1A to 1D are external views of the electronic apparatus 100. The electronic apparatus 100 indicates an electronic telescope. FIG. 1A is a top view of the electronic apparatus 100 viewed from the top, and FIG. 1B is a front view of the electronic apparatus 100 viewed from the front. FIG. 1C is a right side view of the electronic apparatus 100 viewed from the right, and FIG. 1D is a rear view of the electronic apparatus 100 viewed from the back. The electronic apparatus 100 here is an electronic monocle as an example, but the present invention is also applicable to electronic binoculars.

A display unit 28 is disposed inside a finder, and is a display unit to display images and various information. In this embodiment, the display unit 28 is an electronic view finder, which is a display inside the finder.

An eye approach detection unit 57 is an eye approach detection sensor that detects the approach (contact; approach) of an eye (object) to the electronic apparatus 100 (display unit 28) and separation (withdrawal) of the eye therefrom. The eye approach detection unit 57, for which an infrared proximity sensor can be used, for example, can detect an approach of an object to the finder enclosing the display unit 28. When an object approaches, an infrared light emitted from a light-emitting portion (not illustrated) of the eye approach detection unit 57 is reflected by the object, and is received by a light-receiving portion (not illustrated) of the infrared proximity sensor. Depending on the quantity of the received infrared light, the distance of the approaching object from the finder (eye approach distance) can also be determined. Thus the eye approach detection unit 57 detects eye approach, that is, detects the approach distance of an object to the display unit 28 (finder). Approach of the eye is detected when it is detected that an object is approaching the display unit 28 within a predetermined distance from a non-eye approach state (non-approaching state). On the other hand, withdrawal of an eye is detected when an object, of which approach is detected, is withdrawn from the eye approach state (approaching state) by a predetermined distance or more. A threshold to detect the eye approach and a threshold to detect the eye withdrawal may be differentiated by setting hysteresis, for example. After the sys approach is detected, it is assumed that the eye approach state continues until eye withdrawal is detected. Further, after the eye withdrawal is detected, it is assumed that the non-eye approach state continues until eye approach is detected. The infrared proximity sensor is an example, and a different sensor may be used for the eye approach detection unit 57, as long as the sensor can detect approach of an eye or an object, which can be regarded as an eye approach.

A system control unit 50 switches display/non-display of the display unit 28 depending on the eye approach state detected by the eye approach detection unit 57. In other words, in the case where the eye approach detection unit 57 is detecting the eye approach (approach of an object), the electronic view finder displays an image and various information. In the case where the eye approach detection unit 57 is not detecting the eye approach, on the other hand, the electronic view finder does not display images.

An operation unit 70 includes operation members, such as various switches and buttons, to receive various instructions from the user. In this embodiment, the operation unit 70 includes such operation members as a shutter button 61, a moving image button 65, a power button 72, a menu button 73 and a zoom button 74, as illustrated in FIGS. 1A and 1D. Each operation member of the operation unit 70 will be described in detail later.

A recording medium 200 is such a recording medium as a memory card and a hard disk. The recording medium 200 stores images and the like captured by the electronic apparatus 100.

A slot 201 stores the recording medium 200. The recording medium 200 stored in the slot 201 can communicate with the electronic apparatus 100, and can record or reproduce images. A cover 202 is a cover of the slot 201. FIG. 1C indicates a state where the cover 202 is opened, and the recording medium 200 is removed from the slot 201.

Figure 2:
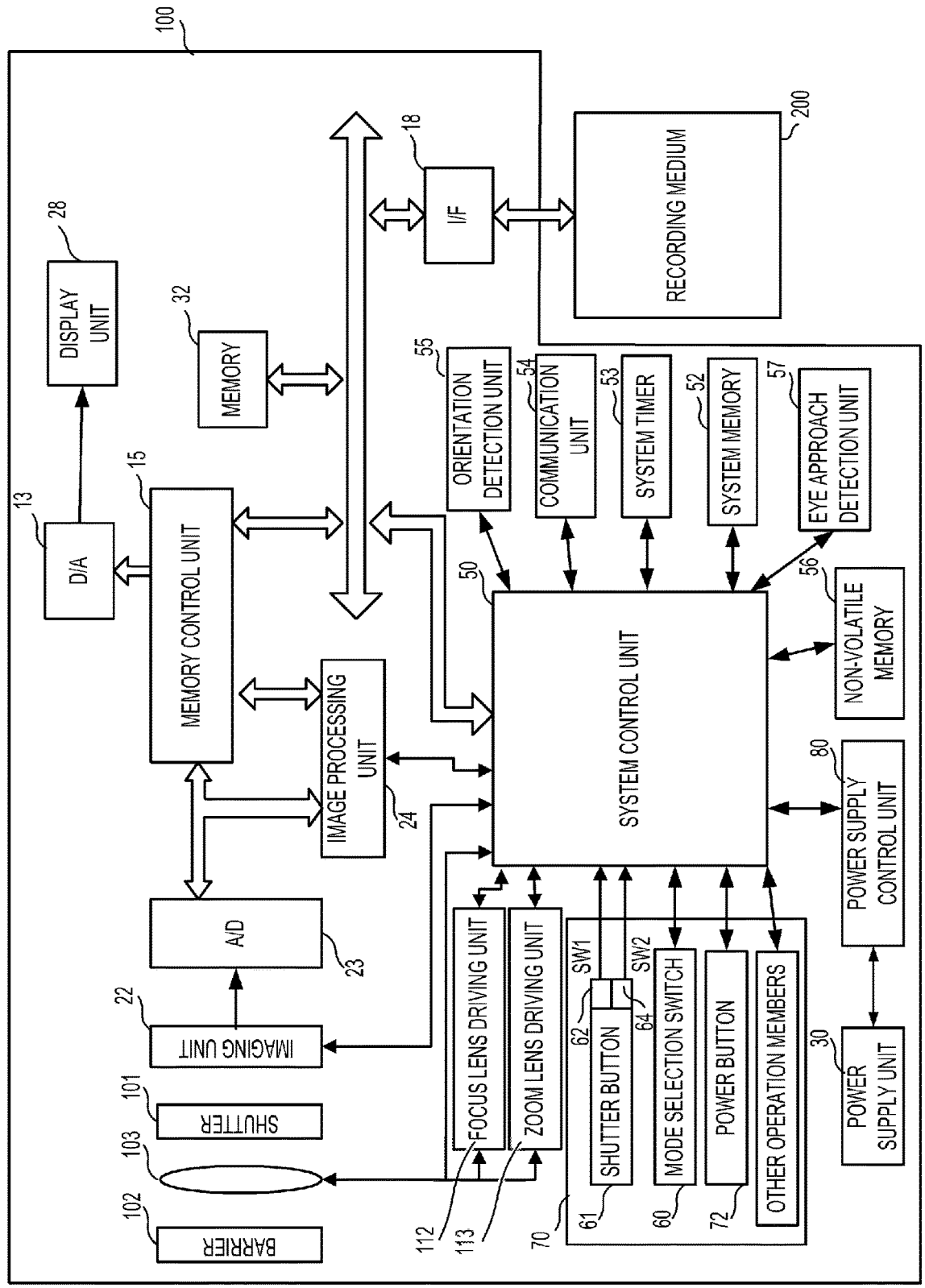
FIG. 2 is a block diagram of the electronic apparatus according to an embodiment.

FIG. 2 is a block diagram of the electronic apparatus 100. A shutter 101 is a shutter that includes an aperture function. An imaging lens 103 is a lens group including a zoom lens and a focus lens. A barrier 102 covers an imaging system, which includes the imaging lens 103, of the electronic apparatus 100, so as to protect the imaging system including the imaging lens 103, the shutter 101 and an imaging unit 22 from contamination and damage.

The imaging unit 22 (image capturing unit) is an image pickup element constituted of a CCD, CMOS element or the like to convert an optical image into an electric signal (analog signal). The imaging unit 22 is controlled by the system control unit 50 and thereby images (captures an image of) a subject (an object).

An A/D convertor 23 converts an electric signal (analog signal) outputted from the imaging unit 22 into a digital signal. A memory control unit 15 controls the transmission/reception of data among the A/D convertor 23, an image processing unit 24 and a memory 32. Output data outputted by the A/D convertor 23 is written to the memory 32 via the image processing unit 24 or the memory control unit 15.

A focus lens driving unit 112 drives a focus lens of the imaging lens 103. In this embodiment, the electronic apparatus 100 performs auto focus (AF) control using the contrast system. Therefore the focus lens driving unit 112 drives the focus lens such that the subject is focused, based on focal point adjustment information (contrast evaluation value) of the imaging optical system acquired by the image processing unit 24 performing image processing. An AF control other than the contrast system, such as a phase difference AF system, or an AF control using a plurality of systems, such as a combination of the contrast system and another system, may be used.

A zoom lens driving unit 113 drives the zoom lens of the imaging lens 103 in accordance with the pressing (zoom operation) the zoom button 74.

The image processing unit 24 performs a predetermined pixel interpolation, resize processing (e.g. demagnification), and color conversion processing on image data. Here the data processed by the image processing unit 24 is data outputted from the A/D convertor 23 or data outputted from the memory control unit 15. The image processing unit 24 also performs predetermined arithmetic processing using captured image data, and the system control unit 50 performs the exposure control and distance measurement control based on the arithmetic processing result. Thereby through-the-lens (TTL) type auto focus (AF) processing, auto exposure (AE) processing and pre-flash emission (EF) processing are performed. The image processing unit 24 also performs predetermined arithmetic processing using the captured image data, and performs TTL type auto white balance (AWB) processing based on the acquired arithmetic processing result.

The memory 32 stores image data, which the A/D convertor 23 converted into digital signals, and image data to be displayed on the display unit 28. The memory 32 has sufficient storage capacity to store a predetermined number of still images and to store a predetermined time duration of moving images and sound. The memory 32 is also a memory (video memory) to display images.

A D/A convertor 13 converts the image data (a digital signal) for display, stored in the memory 32, into an analog signal, and outputs (supplies) the analog signal to a display unit 28. The display unit 28 performs display, corresponding to the analog signal acquired from the D/A convertor 13, on such a display as an LCD. By sequentially transferring the data, which has been A/D-converted by the A/D convertor 23 and stored in the memory 32, to the display unit 28 or the EVF 29 and displaying the data thereon, the live view (LV) display can be performed. An image displayed by the live view display will hereafter be called a "live view image (LV image)".

The system control unit 50 is a control unit constituted of at least one processor or a circuit, and controls each functional unit of the electronic apparatus 100. The system control unit 50 implements the processing according to this embodiment by executing a program stored in a non-volatile memory 56. Further, the system control unit 50 performs display control for the display unit 28 by controlling the memory 32, the D/A convertor 13, the display unit 28 and the like.

The non-volatile memory 56 is a recording medium that is electrically erasable and recordable. For the non-volatile memory 56, an EEPROM, for example, is used. The non-volatile memory 56 stores constants, programs, and the like for operating the system control unit 50. The program here includes a computer program to execute various flow charts which will be described later in this embodiment.

A RAM is used for a system memory 52. In the system memory 52, constants and variable for operating the system control unit 50, programs read from the non-volatile memory 56, and the like are developed. A system timer 53 is a timer to measure a time required for various controls and the time of an internal clock.

The operation unit 70 includes a plurality of operation members to receive user operations. The plurality of operation members of the operation unit 70 are a mode selection switch 60, the shutter button 61, the moving image button 65, the power button 72, the menu button 73 and the zoom button 74. The operation unit 70 outputs an instruction, corresponding to the received operation, to the system control unit 50.

The mode selection switch 60 is an operation unit to switch an operation mode of the electronic apparatus 100. The mode selection switch 60 switches the operation mode of the system control unit 50 to a still image capturing mode, a moving image capturing mode, a reproduction mode, or the like, for example. Modes included in the still image capturing mode are: auto image capturing mode, auto scene determination mode, manual mode, aperture priority mode (Av mode), a shutter speed priority mode (Tv mode), and a program AE mode (P mode). Various scene modes to set image capturing for each image capturing scene, a custom mode, and the like, are also included. The user can switch the mode to any one of these modes using the mode selection switch 60. It is also possible to switch to an image capturing mode list screen first using the mode selection switch 60, then to select one of the plurality of displayed modes using another operation member. In the same manner, the moving image capturing mode may include a plurality of modes.

The shutter button 61 is an operation unit to input various operation instructions to the system control unit 50. The shutter button 61 includes a first shutter switch 62 and a second shutter switch 64. The shutter button 61 can be pressed in two steps, and the first shutter switch 62 is pressed by the first step of pressing, and the second shutter switch 64 is pressed by the second step of pressing.

The first shutter switch 62 is turned ON when the shutter button 61 disposed on the electronic apparatus 100 is in mid-operation, that is, in the half-depressed state (image capturing preparation instruction), which generates a first shutter switch signal SW1. In other words, pressing of the first shutter switch 62 corresponds to the image capturing preparation instruction. By the first shutter switch signal SW1, auto focus (AF) processing, auto exposure (AE) processing, auto white balance (AWB) processing, pre-flash emission (EF) processing or the like can be started.

The second shutter switch 64 is turned ON when the operation of the shutter button 61 is completed, that is, in the fully depressed state (image capturing instruction), which generates a second shutter switch signal SW2. By the second shutter switch signal SW2, the system control unit 50 starts a series of image capturing processing from reading signals from the imaging unit 22 to writing the image data to the recording medium 200.

The power button 72 is a push button to switch power ON/power OFF of the electronic apparatus 100. The electronic apparatus 100 is in the power ON state when the power button 72 is pushed in, and the electronic apparatus 100 is in the power OFF state when the power button 72 is not pushed in.

When the menu button 73 is pressed, the menu screen, in which various settings can be performed, is displayed on the display unit 28. The user can perform various settings by performing various operations while checking the menu screen displayed on the display unit 28. For example, when the menu screen is displayed, the shutter button 61 and the moving image button 65 function as the buttons to move the cursor to the left or right on the plurality of selection items, and the zoom button 74 functions as a determination button, whereby various settings can be performed.

The zoom button 74 is an operation member for the user to perform the operation to instruct zooming (zoom operation). Based on a degree of operation (pressing duration or number of times of pressing) performed on the zoom button 74, the system control unit 50 calculates the zoom driving speed and driving direction, and moves the zoom lens along the optical axis in accordance with the calculation result. In other words, zoom is controlled (focal distance changes) in accordance with the degree of operation performed on the zoom button 74.

The power supply control unit 80 detects whether a battery is installed, a type of battery, and the residual amount of the battery. The power supply control unit 80 includes a battery detection circuit, a DC-DC convertor, a switch circuit to switch to a block to be energized, and the like. Based on the detection result and control by the system control unit 50, the power supply control unit 80 controls the DC-DC convertor so as to supply the required voltage to each functional unit (including the recording medium 200) during a required period.

A power supply unit 30 (battery) includes a primary battery (e.g. alkali battery, lithium battery), a secondary battery (e.g. NiCd battery, NiMH battery, Li battery), an AC adaptor, and the like.

A recording medium I/F 18 is an interface with the recording medium 200 (e.g. memory card, hard disk). The recording medium 200 is such a recording medium as a memory card to record a captured image, and is constituted of a semiconductor memory, a magnetic disk, or the like.

A communication unit 54 is connected with the outside wirelessly or via cable, and performs transmission and reception of video signals, audio signals, and the like. The communication unit 54 can be connected with the outside via a wireless local area network (LAN) or Internet. The communication unit 54 can send an image captured by the imaging unit 22 (including a live view image) and an image recorded in the recording medium 200. The communication unit 54 can also receive image data and various other information from an external apparatus.

An orientation detection unit 55 detects an orientation of the electronic apparatus 100 with respect to the gravity direction. Based on the orientation detected by the orientation detection unit 55, it can be determined whether an image captured by the imaging unit 22 is an image captured by the electronic apparatus 100 that is held in the horizontal position, or an image captured by the electronic apparatus 100 that is held in the vertical position. The system control unit 50 can attach the orientation information, corresponding to the orientation detected by the orientation detection unit 55, to an image file of the image captured by the imaging unit 22 or can record the image in a rotated state. For the orientation detection unit 55, an acceleration sensor, a gyro sensor, or the like, can be used. Using the acceleration sensor or the gyro sensor, the orientation detection unit 55 can also detect the movement of the electronic apparatus 100 (e.g. pan, tile, lift, still).

(Display Control Processing)

Figure 3:
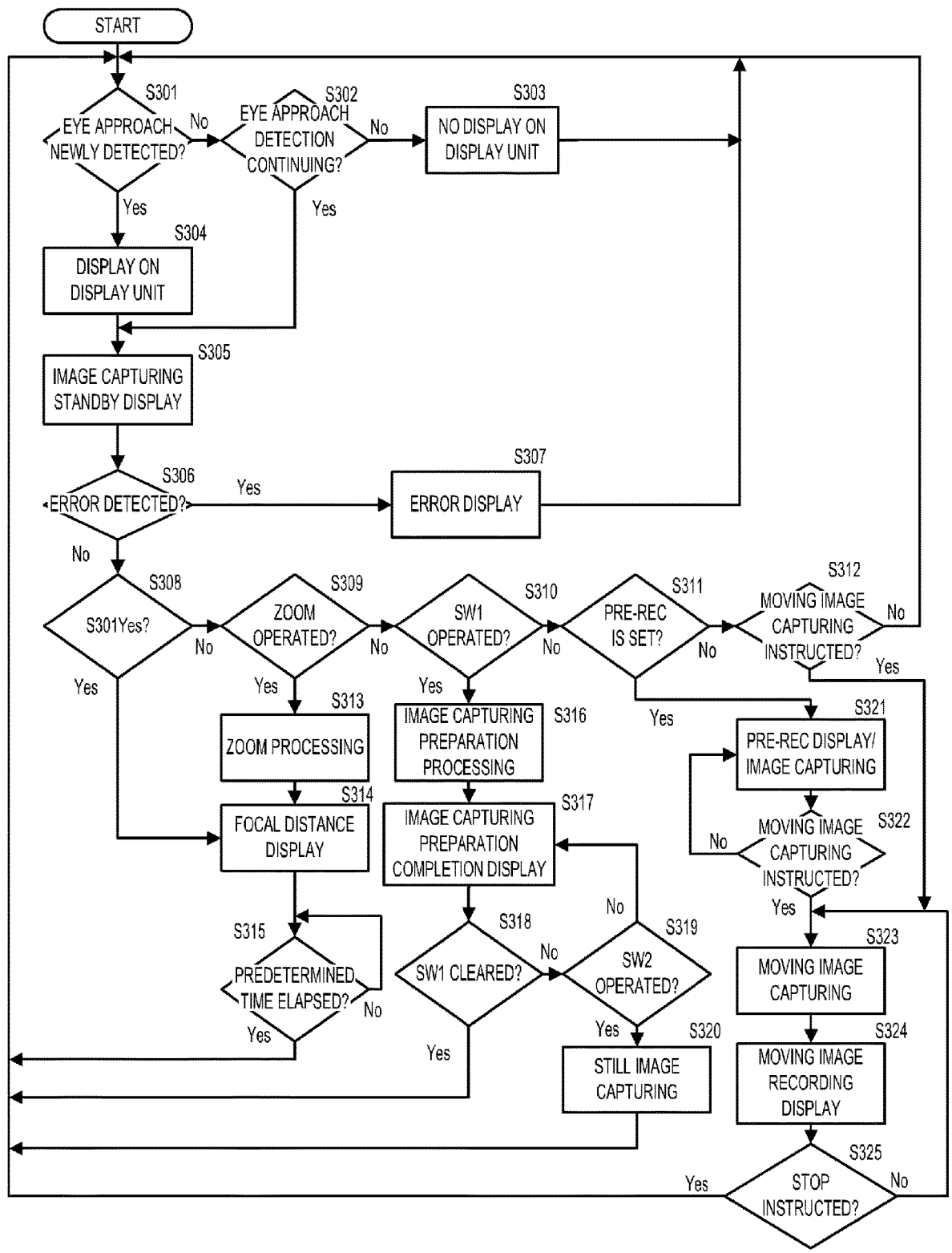
FIG. 3 is a flow chart of display control processing according to an embodiment.

Display control processing by the display unit 28 according to this embodiment will be described next with reference to FIG. 3. FIG. 3 is a flow chart of the display control processing. When the power is turned ON and the electronic apparatus 100 is started thereby, the processing of this flow chart starts. The flow chart in FIG. 3 is implemented when the program recorded in the non-volatile memory 56 is developed in the system memory 52, and the system control unit 50 executes the program. FIG. 4A to FIG. 7B indicate items displayed in the embodiment to be described with reference to FIG. 3. A table of FIG. 8 lists more display items and display timings thereof.

In S301, the system control unit 50 controls the eye approach detection unit 57, and determines whether eye approach (approach of an object) is newly detected. For example, the system control unit 50 can determine whether eye approach is newly detected or not by recording the state of eye approach using an eye approach flag in advance. Specifically, the system control unit 50 sets the eye approach flag to indicate the eye approach detection to "True" if eye approach is detected, or to "False" if eye approach is not detected, and records this information in the memory 32. Then if eye approach is detected in a state where the eye approach flag is False, the system control unit 50 determines that eye approach is newly detected. Processing advances to S304 if eye approach is newly detected, or to S302 if not.

In S302, the system control unit 50 controls the eye approach detection unit 57, and determines whether eye approach is continuing (maintained). The system control unit 50 determines that the eye approach is continuing if the eye approach is detected in the state where the eye approach flag is True. Processing advances to S305 if it is determined that the eye approach is continuing, or to S303 if not.

In S303, the system control unit 50 sets the display unit 28 to the non-display state. In S304, the system control unit 50 sets the display unit 28 to the display state. The display/non-display of the display unit 28 is switched depending on the eye approach detection, as mentioned above. By the processing steps in S303 and S304, the display unit 28 is set to the non-display state while the eye approach is not detected, hence the power consumption of the electronic apparatus 100 can be reduced. In S303, the system control unit 50 may control the display unit 28 to make the display darker than that in S304, instead of switching the display unit 28 to the non-display state. Further, the display unit 28 may be switched to the non-display state in S303 after a predetermined time (e.g. 3 seconds, 5 seconds) have elapsed after non-eye approach is determined in S302.

Figure 4A:
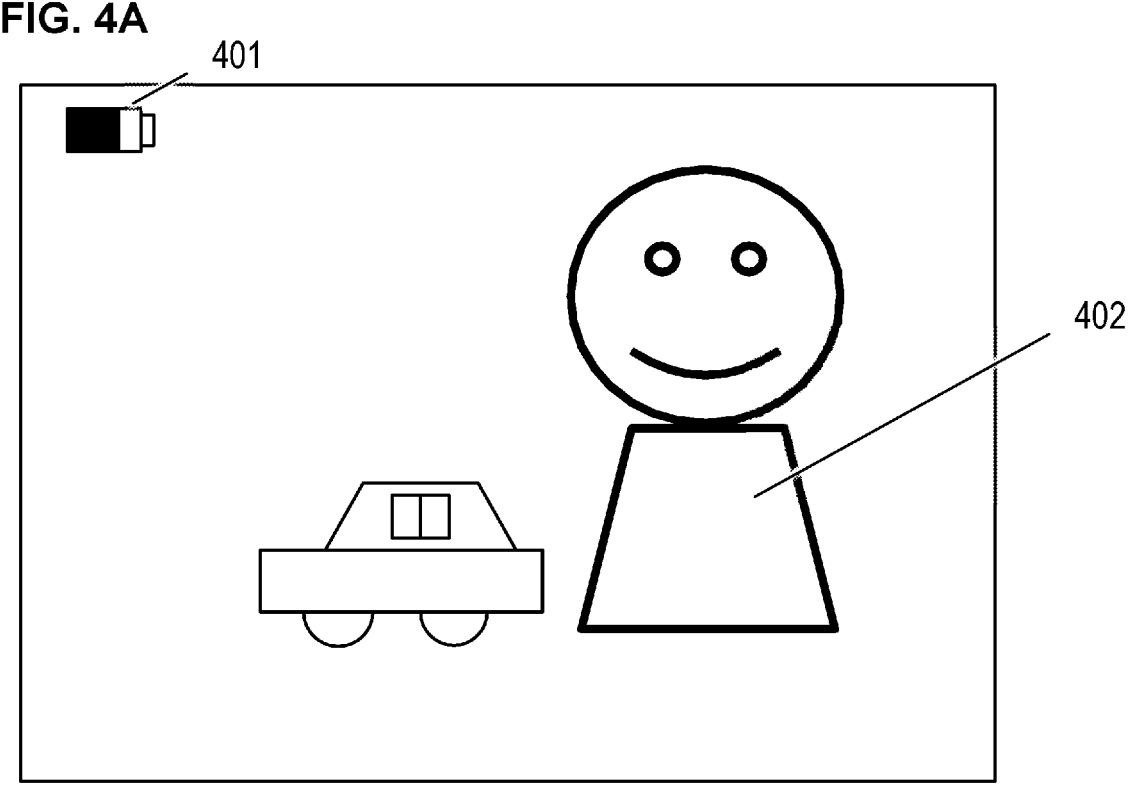
FIG. 4A is a diagram indicating an image capturing standby display according to an embodiment.

In S305, the system control unit 50 changes the state to the image capturing standby state, and performs an image capturing standby display on the display unit 28. FIG. 4A indicates the image capturing standby display on the display unit 28. The system control unit 50 acquires the residual capacity (residual amount) of the power supply unit 30 (battery) via the power supply control unit 80, and displays a battery item 401, which is a display item to indicate the residual capacity. If the display unit 28 is the display state, the battery item 401 is always displayed regardless of the state of the electronic apparatus 100 (e.g. regards whether the shutter button 61 is pressed or not). By this processing, the user can always recognize the residual capacity of the power supply unit 30 even in the case of viewing a subject. Not only the residual capacity of the power supply unit 30 but also a communication state of the electronic apparatus 100 and a current time, for example, may be displayed constantly. In the image capturing standby state, no information related to the main subject 402 is displayed. This is because display of the information, to indicate the main subject (e.g. display of a frame to indicate a face), makes it difficult for the user to view the main subject.

In S306, the system control unit 50 determines whether an error (abnormality) of the electronic apparatus 100 is detected. An error refers to a state where the electronic apparatus 100 cannot be used normally, such as a lens error or an error caused by heat. Processing advances to S307 if it is determined that an error is detected, or to S308 if not.

Figure 4B:
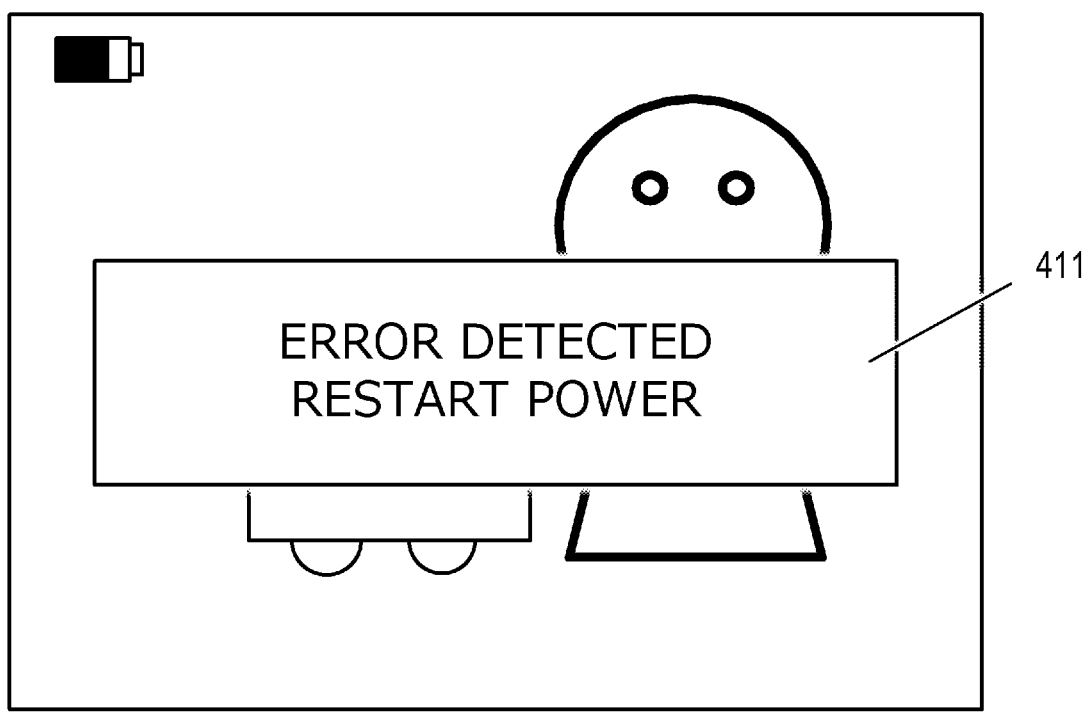
FIG. 4B is a display indicating an error warning according to an embodiment.

In S307, the system control unit 50 determines a type of the detected error (abnormality), and displays an error warning 411 (a display item indicating warning display to user) on the display unit 28, as indicated in FIG. 4B. Here the system control unit 50 may display (notify) only the existence of an error generation, or may also display an error type or troubleshooting (e.g. restart the power supply). During the error display, the system control unit 50 may cancel operation of the electronic apparatus 100 that is in the abnormal state by disabling all user operations (other than the instruction to turn power OFF) to all the operation members (buttons) other than the power button 72. In this case, if the power button 72 is pressed during the error display, the power of the electronic apparatus 100 is turned OFF, hence the processing of this flow chart ends.

In S308, the system control unit 50 determines whether the eye approach is newly detected in S301 (whether it is Yes in S301). For example, the system control unit 50 records a flag, which indicates whether the eye approach is detected in S301, in the memory 32 in advance, and it is determined in S308 whether the eye approach is detected or not based on this flag. Processing advances to S314 if it is determined that eye approach is newly detected in S301, or to S309 if not.

In S309, the system control unit 50 determines whether the zoom operation is performed. In this embodiment, the zoom operation is performed by pressing the zoom button 74. In this embodiment, the focal distance related to the magnification of zoom is 100 mm in the non-zoom state, 400 mm in the optical zoom state, and 800 mm in the optical zoom and electronic zoom state. These three focal distances (zoom states) are switched in sequence (toggled) each time the zoom button 74 is pressed. Processing advances to S313 if it is determined that the zoom operation is performed, or to S310 if not.

In S310, the system control unit 50 determines whether the first shutter switch 62 is pressed (SW1 operation is performed) or not (whether the image capturing preparation was instructed). Processing advances to S316 if it is determined that SW1 operation is performed, or to S311 if not.

In S311, the system control unit 50 determines whether pre-rec is set in the imaging unit 22. The pre-rec setting here refers to a setting to capture (record) a moving image in advance in a predetermined period (e.g. 3 seconds, 5 seconds) before start of recording (capturing) the moving image is instructed. Processing advances to S321 if it is determined that pre-rec is set, or to S312 if not. In the case where pre-rec is set, a moving image for a duration of a predetermined period is always recorded in the memory 32 in advance, and when the image capturing is instructed, the moving image is recorded in the recording medium 200, including this portion recorded in the memory 32.

In S312, the system control unit 50 determines whether operation to instruct moving image capturing is performed. The operation to instruct moving image capturing here refers to pressing the moving image button 65. Processing advances to S323 if the operation to instruct moving image capturing is performed, or to S301 if not.

In S313, the system control unit 50 controls the zoom lens driving unit 113, and performs zoom processing (magnification change processing) using the zoom lens. Specifically, when the zoom processing is performed, the system control unit 50 calculates the zoom position to which the zoom lens should move, based on the current position of the zoom lens and the performed zoom operation. Then the system control unit 50 moves the zoom lens to the calculated zoom position by controlling the zoom lens driving unit 113. Thereby the focal distance (magnification) in the imaging system is changed.

In S314, the system control unit 50 displays the information on the focal distance on the display unit 28. Specifically, the system control unit 50 displays a focal distance item to indicate the current focal distance, along with the live view image (captured image). Instead of the focal distance, an item to indicate the magnification (zoom magnification), that is, an item to indicate the state of zoom, may be displayed.

Figure 5A:
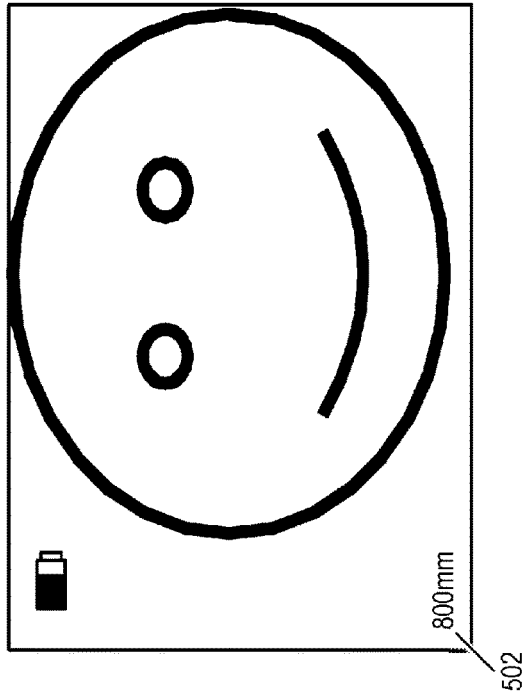
FIGS. 5A to 5D are diagrams for explaining zoom according to an embodiment.

The display of the focal distance item in the case where the zoom operation is performed will now be described in detail. FIG. 5A is a display example of the display unit 28 in the case of the non-zoom state (focal distance is 100 mm) when the image capturing standby screen is displayed. In this case, the focal distance item is not displayed so that viewing the subject is not interrupted. If the zoom button 74 is pressed once in this display state, zooming is performed up to the focal distance 400 mm.

Figure 5C:
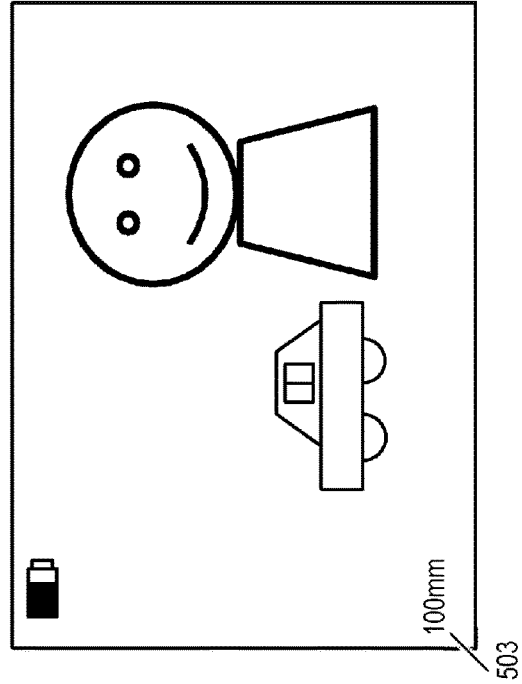
Figure 5B:
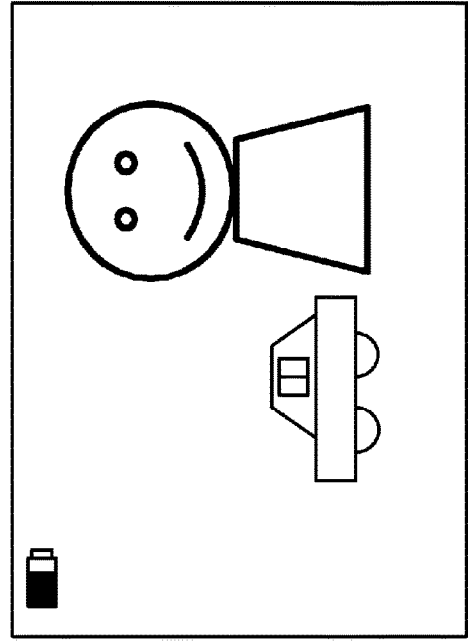
Figure 5D:
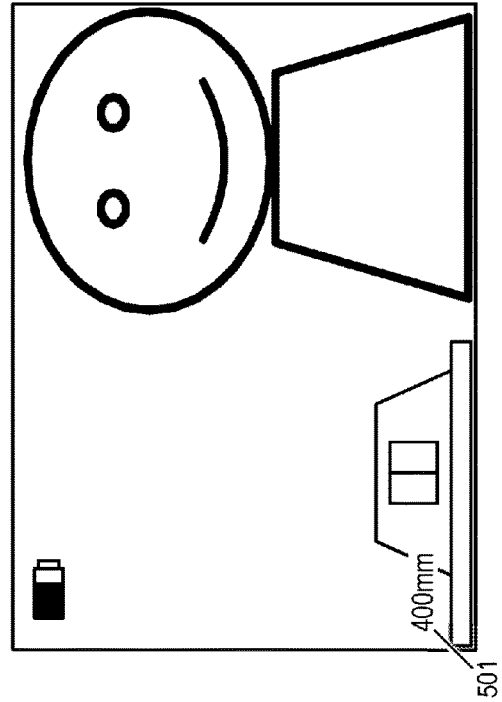

FIG. 5B is a display example of the display unit 28 after the zoom button 74 is pressed once in the state indicated in FIG. 5A, whereby zooming is performed up to the focal distance 400 mm. The focal distance item 501 displayed in FIG. 5B indicates the focal distance 400 mm. If the zoom button 74 is pressed in the state indicated in FIG. 5B, zooming, including electronic zooming, is performed, as indicated in FIG. 5C, and zooming is performed up to the focal distance 800 mm. The focal distance item 502 in FIG. 5C indicates the focal distance 800 mm. If the zoom button 74 is pressed again here, the state changes to the non-zoom state, in which the focal distance is 100 mm, as indicated in FIG. 5D. In FIG. 5D, the focal distance item 503 indicating 100 mm is displayed, although the focal distance is the same as FIG. 5A, since the operation to change the focal distance was performed in the state of FIG. 5C just before FIG. 5D. In this way, the value indicating the focal distance is updated and displayed each time zooming is performed, hence the magnified state of the currently displayed live view image can be easily recognized when the user changes the focal distance.

In S315, the system control unit 50 determines whether a predetermined time has elapsed since the focal distance item began to be displayed. The focal distance item is not displayed and processing returns to S301 if it is determined that the predetermined time has elapsed, or processing of S315 is repeated if not. In other words, the focal distance item is not displayed when a predetermined time has elapsed in S315. Thereby the possibility of interrupting the user from viewing the subject by the lengthy display of the focal distance item can be reduced. In S315, the system control unit 50 changes the flag, which indicates whether eye approach is detected or not in S301, to False, whereby it can be determined whether eye approach is newly detected or not in S308 the next time. The predetermined time is 1 second or 2 seconds, for example.

As described above, in the case where eye approach is newly detected (S308: Yes) and zoom operation is performed (S309: Yes), the focal distance item is displayed on the display unit 28 along with the live view image (captured image). Therefore the user can check the size (magnification) of the viewing subject without separately performing an operation to display the focal distance item. Furthermore, the focal distance item is no longer displayed when a predetermined time has elapsed after changing the focal distance, hence the possibility of the focal distance item dropping the visibility can be reduced when the user views the subject.

In S316, the system control unit 50 performs the image capturing preparation processing (image capturing preparation instruction). The image capturing preparation processing (processing performed during image capturing preparation) includes at least one of the auto focus (AF) processing (distance measurement processing), auto exposure (AE) processing, auto white balance (AWB) processing, pre-flash emission (EF) processing, and the like. In S317 described herein below, it is assumed that at least AF processing (distance measurement processing) is performed. The image capturing preparation processing also includes photometric processing, and the photometric processing may be performed without performing the distance measurement processing in accordance with the image capturing preparation instruction. The distance measurement processing may be performed using different instruction means.

Figure 6:
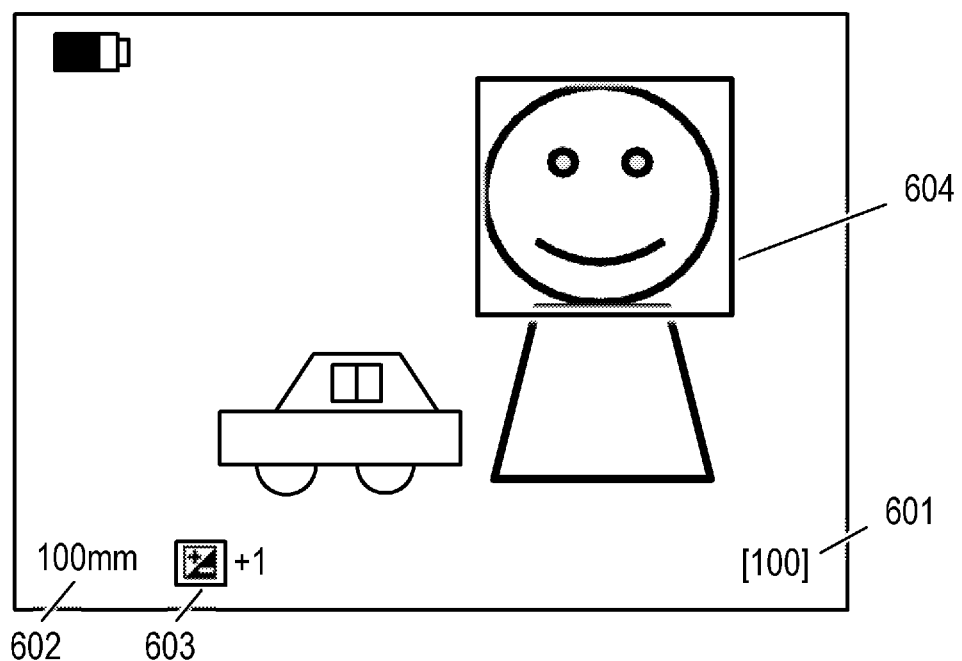
FIG. 6 is a diagram indicating a display of image capturing preparation completion according to an embodiment.

In S317, on the display unit 28, the system control unit 50 performs the image capturing preparation completion display after the image capturing preparation is instructed. FIG. 6 is a display example on the display unit 28 when the image capturing preparation is completed. Responding to the image capturing preparation instruction in S316, an AF frame 604, which is an item to indicate a position where AF was performed (distance measurement area, focusing position/area), is displayed. Thereby a position where the focusing was performed is indicated. Further, when the image capturing preparation is completed, an item 601 to indicate a number of captured images (a number of capturable still images), a focal distance item 602, an item 603 to indicate a set value of the exposure correction, and the like, are also displayed on the display unit 28. In this way, when the image capturing preparation is completed, the electronic apparatus 100 displays setting information and frame information that are useful for capturing still images, along with the AF frame, before capturing images. This allows the user to instruct image capturing after confirming whether desired image capturing conditions are set.

In S318, the system control unit 50 determines whether pressing the first shutter switch 62 (image capturing preparation instruction) is cleared. Processing returns to S301 if the pressing is cleared, or advances to S319 if not. In the case where it is determined that the image capturing preparation instruction is cleared in S318, the display of the image capturing preparation completion, performed in S317, is stopped, and the items are no longer displayed. In other words, the system control unit 50 does not display the AF frame 604, the item 601, the focal distance item 602 and the item 603 to indicate the set value of the exposure correction.

In S319, the system control unit 50 determines whether the second shutter switch 64 is pressed (SW2 operation) or not (whether the image capturing is instructed or not). Processing advances to S320 if it is determined that the SW2 operation is performed, or to S317 if not.

In S320, the system control unit 50 controls the imaging unit 22 and captures a still image. When capturing the still image in S320 ends, the items displayed in S317 are no longer displayed. The system control unit 50 may start capturing the moving image depending on the operation mode. In the case of the moving image capturing, the capturing of the moving image is started in S320, and the items described later in S324 are displayed.

Figure 7A:
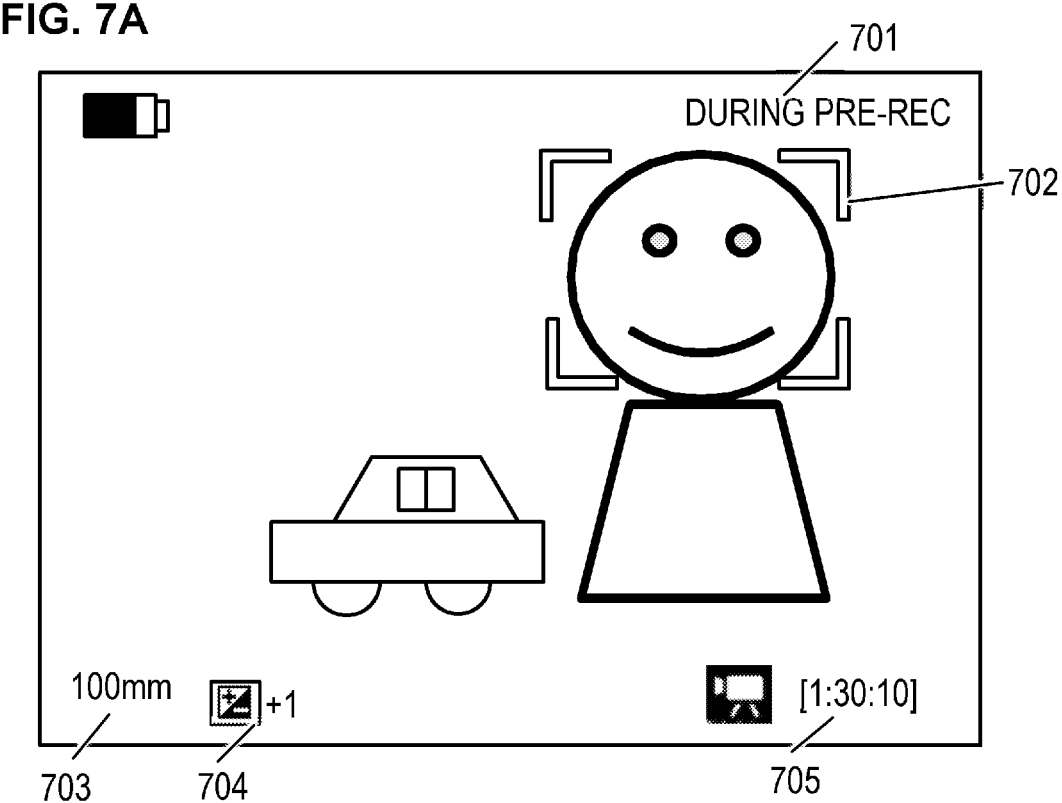
FIG. 7A is a diagram indicating a pre-rec display according to an embodiment.

In S321, the system control unit 50 performs the pre-rec display on the display unit 28, and captures the moving image by controlling the imaging unit 22. FIG. 7A is a display example of the display unit 28 during the pre-rec display. In the case of performing pre-rec, a focal distance item 703 and an item 704 to indicate a set value of exposure correction are displayed, just like the case of the image capturing preparation completion display, including the distance measurement processing. During the pre-rec display, an item 705 to indicate recordable time of the moving image (moving image recordable time), and an item 702 (AF frame) to indicate a position where AF was performed (distance measurement area), are also displayed. The displayed position of the item 702 changes each time the distance measurement is performed. Since an item 701, indicating that pre-rec is currently ongoing, is displayed, the user can recognize that pre-rec is ongoing. The item 705 may be displayed in red, for example, even in the image capturing standby display, if the recordable time of the moving image is 0.

Since the information required for recording a moving image is displayed in the state before the user instructs the start of recording the moving image, the user can confirm that desired image capturing conditions are set before instructing the start of recording the moving image.

In S322, the system control unit 50 determines whether operation to instruct the start of the moving image capturing is performed, just like S312. Processing advances to S323 if it is determined that the operation to instruct the start of moving image capturing is performed, or returns to S321 is not.

In S323, the system control unit 50 controls the imaging unit 22 and captures the moving image (records the captured moving image in the recording medium 200). In the case where pre-rec is set, the system control unit 50 also records the moving image, which was recorded in the memory 32 for a predetermined time before instructing the start of moving image capturing, in the recording medium 200.

Figure 7B:
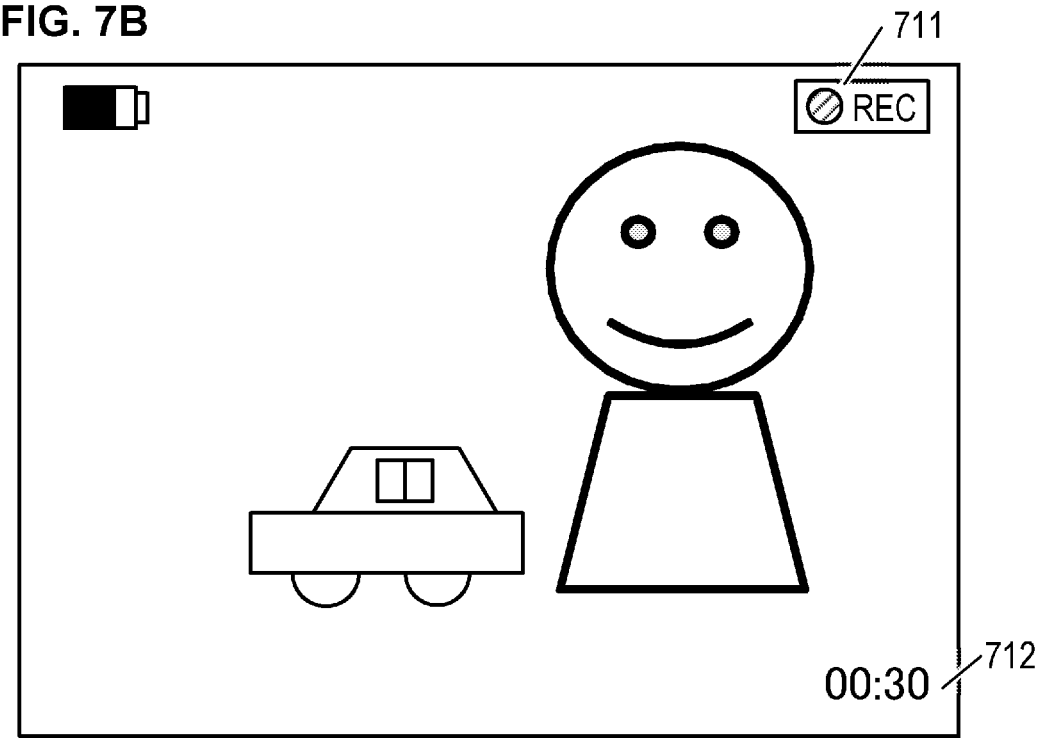
FIG. 7B is a diagram indicating a moving image recording display according to an embodiment.

In S324, the system control unit 50 displays the moving image recording display on the display unit 28. FIG. 7B is an example of the moving image recording display. In the moving image recording display, an item 711 to indicate that the moving image recording (moving image capturing) is ongoing, and an item 712 to indicate the duration of time of the currently recording moving image, are displayed along with the live view image. The focal distance item, the items to indicate the AF frame and the set value of the exposure correction, and the like, on the other hand, are not displayed. In this way, items less than those of the pre-rec display are displayed during the moving image recording, whereby the drop in visibility of the image during the moving image recording can be minimized, and still the user can confirm the required information.

In S325, the system control unit 50 determines whether operation to instruct the stop of moving image capturing is performed. Recording of the moving image is stopped and processing returns to S301 if the operation to instruct the stop of moving image capturing is performed or processing advances to S323 if not. In the case where recording of the moving image is stopped in S325, the moving image recording display is no longer displayed.

In this embodiment, as described above, when eye approach is detected and display is performed on the display unit 28, a battery item to indicate the residual amount of the power supply unit 30 (battery) is displayed. On the other hand, items to indicate a set value of exposure and a number of capturable images (setting information for image capturing) and the AF frame (distance measurement information) are displayed in the case of the following (1) or (2). In other cases, the items to indicate a set value of exposure and a number of capturable images (setting information for image capturing) and the AF frame (distance measurement information) are controlled to not be displayed on the display unit 28.

(1) the case where the first shutter switch 62 is pressed (S310: Yes)

(2) the case where pre-rec is set and the pre-rec processing is performed before operation to instruct moving image capturing (S311: Yes)

When eye approach is ongoing, the focal distance is displayed only in the case of the above (1), (2), the following (3) or (4).

(3) the case where eye approach is newly detected (S308: Yes)

(4) the case where zoom operation is performed (S309: Yes)

In this embodiment, as described above, the electronic apparatus does not display the items related to the image capturing setting (e.g. set value of exposure correction) until the image capturing preparation is instructed, and displays the items related to the image capturing setting and the AF frame when the image capturing preparation is instructed. Because of this control of display, the items related to the image capturing and the AF frame are not displayed on the display unit in the state where the user desired to view the live view image without attempting to capture the image, hence it is easy to view the subject. On the other hand, the items to indicate the information related to the image capturing are displayed in the state where the user is about to capture the image, hence the user can perform the operation to instruct image capturing after the image capturing setting is confirmed.

FIG. 8 is a table indicating the display timing of each item which is displayed on the display unit 28. FIG. 8 indicates whether each item is displayed or not in the case of the image capturing standby state (state where moving image is not captured using pre-rec setting, or the state before instructing SW1), and in other cases (state after instructing the image capturing preparation or state during pre-rec). Here beside the item of the set value of the exposure correction and the battery item described above, an item to indicate the AF system, an item to indicate the connection state of Bluetooth® and Wi-Fi®, and an item to indicate the connection state of 4G (radio waves) are listed as an example. Such an item to indicate the AF method and items to indicate the connection state are not displayed during the image capturing standby state, but are displayed in the case where the image capturing is started by the pre-rec setting, and after the image capturing preparation is instructed. This is because these items are information of which display is not required very much to view the subject using the electronic apparatus. The item to indicate the connection state of Wi-Fi, however, may be displayed even during the image capturing standby state in the case where Wi-Fi is not connected (in the case of a connection error).

Furthermore, in FIG. 8, a temperature warning item to warn of the rise of temperature of the electronic apparatus, and a moving image heat restriction item to restrict capturing of the moving image, are listed as an example. These two items are displayed when it is determined that the rise of temperature of the electronic apparatus could affect the operation of the electronic apparatus, and are not displayed when a rise of temperature of the electronic apparatus is not detected. The temperature warning item and moving image heat restriction item, which are to notify the user that operation of the electronic apparatus could be affected, are displayed regardless of the SW1 instruction and the like, as long as the display unit 28 is in the display state.

In this embodiment, the image capturing preparation processing and the image capturing preparation completion processing (S316, S317) are executed by pressing the first shutter switch 62, but these processing steps may be started by operating a different operation member. For example, these processing steps may be executed when the image capturing preparation mode is selected by pressing the mode selection switch 60.

Whereas preferred embodiments of the present invention have been described, and the present invention is not limited to these embodiments, but various modification and changes may be performed within the scope of the spirit thereof.

In the above description, various controls are performed by the system control unit 50, but may be performed by one hardware unit, or a plurality of hardware units (e.g. a plurality of processors and circuits) which share the processing steps so as to control the apparatus as a whole.

Whereas the present invention has been described based on the preferred embodiments thereof, the present invention is not limited to these specific embodiments, but may include various modes within the scope not departing from the spirit of the invention. Furthermore, each of the embodiments described above is merely an example of the present invention, and each embodiment may be suitably combined.

In the above embodiments, the case of applying the present invention to the electronic apparatus was described as an example, but the present invention is not limited to this example, and is applicable to any electronic apparatus that can capture an image of a subject displayed on the display unit. In other words, the present invention is applicable to a digital camera, a personal computer, PDA, a smartphone, a portable telephone terminal, a portable image viewer, a game machine, and the like.

The present invention is applicable not only to the main unit of the electronic apparatus, but also to a control device (display control device) that communicates with an electronic apparatus (including an imaging apparatus and a network camera) via cable or wireless communication, and remotely controls the electronic apparatus. Examples of a device that remotely controls an electronic apparatus are a smartphone, a tablet PC and a desktop PC. In this case, based on the operation performed at the control device side or processing performed at the control device side, the control device notifies the imaging apparatus with a command to perform various operations and settings, whereby the electronic apparatus can be remotely controlled. Further, a live view image captured by the electronic apparatus may be received and displayed at the control device side via cable or wireless communication.

According to the present invention, both the operability when an image is captured and the visibility of the live view image can be improved.

While the present invention has been described in detail on the basis of the preferred embodiments, the present invention is not limited to the specific embodiments, and various modes within the range not departing from the gist of the invention are also included in the present invention. Furthermore, each of the above-mentioned embodiments is merely illustrative of one embodiment of the present invention, and the embodiments can be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the above-mentioned embodiments, and can be variously changed and modified without departing from the spirit and scope of the present invention. Thus, the following claims are attached in order to clarify the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus comprising:
a processor; and
a memory storing a program which, when executed by the processor, causes the electronic apparatus to:
perform detection processing to detect approaching an object toward a finder;
perform instruction processing that can perform an image capturing preparation instruction including an instruction for performing distance measurement processing; and
perform control processing to control
in a case of a first state including a state of not receiving the image capturing preparation instruction performed by the instruction processing, to display a captured image captured by an image pickup element but not to display a first item indicating setting information related to image capturing and a second item indicating distance measurement information, on the display to display 1) the second item at a position according to the distance measurement processing and 2) the first item, on the display, in response to receiving the image capturing preparation instruction performed by the instruction processing, and in the first state, to display an item to indicate a focal distance of the image pickup element among the first item on the display, together with displaying the captured image, in response to a new detection of an object approaching toward the finder in the detection processing.

2. The electronic apparatus according to claim 1, wherein the setting information related to image capturing indicated by the first item includes information on a number of still images capturable by the image pickup element.

3. The electronic apparatus according to claim 1, wherein the setting information related to image capturing indicated by the first item includes information on a set value of exposure correction.

4. The electronic apparatus according to claim 1, wherein the second item indicates a distance measurement area.

5. The electronic apparatus according to claim 1, wherein in the control processing, it is controlled that a third item to indicate a state of the electronic apparatus is displayed on the display regardless of whether the image capturing preparation instruction is received or not.

6. The electronic apparatus according to claim 5, wherein the third item indicates a residual amount of a battery of the electronic apparatus.

7. The electronic apparatus according to claim 5, wherein in the control processing, the display is controlled not to display in a case where the approaching is not detected.

8. The electronic apparatus according to claim 1, wherein in the control processing, it is controlled that the item to indicate the focal distance is hidden in a case where a predetermined time has elapsed since the item to indicate the focal distance is displayed.

9. The electronic apparatus according to claim 1, wherein in the instruction processing, it is possible to perform an instruction to change a magnification of an object in the captured image, and in the control processing, it is controlled such that, in a case where the instruction to change the magnification is received, the item to indicate the focal distance is displayed on the display.

10. The electronic apparatus according to claim 1, wherein in the control processing, it is controlled that an item to indicate a warning to a user is displayed on the display in a case where an abnormality of the electronic apparatus is detected.

11. The electronic apparatus according to claim 10, wherein in the instruction processing, it is possible to perform an instruction to switch ON/OFF of a power supply of the electronic apparatus, and in the control processing, instructions other than the instruction to turn the power supply OFF is disabled in a case where the abnormality of the electronic apparatus is detected.

12. The electronic apparatus according to claim 1, further including an operation member that is capable of being pressing in two steps, wherein the image capturing preparation instruction is an instruction corresponding to pressing the operation member in a first step, and the image pickup element captures an image in a case where the operation member is pressed in a second step.

13. The electronic apparatus according to claim 1, further comprising:

the display that is disposed in the finder; and the image pickup element configured to capture an image of an object.

14. The electronic apparatus according to claim 1, wherein in the control processing, it is controlled that the first item and the second item are displayed on the display in response to completion of the distance measurement processing after receiving the image capturing preparation instruction performed by the instruction processing.

15. A method of controlling an electronic apparatus having a processor and a memory storing a computer program for execution by the processor, the method comprising:

performing detection processing to detect approaching an object toward a finder;

performing instruction processing that can perform an image capturing preparation instruction including an instruction for performing distance measurement processing; and performing control processing, wherein in a case of a first state including a state of not receiving the image capturing preparation instruction performed by the instruction processing, displaying an image captured by an image pickup element but not displaying a first item indicating setting information related to image capturing and a second item indicating distance measurement information;

displaying 1) the second item at a position according to the distance measurement processing and 2) the first item, on the display, in response to receiving the image capturing preparation instruction performed by the instruction processing, and in the first state, displaying an indication of a focal distance of the image pickup element among the first item on the display together with displaying the captured image, in response to a new detection of an object approaching toward the finder in the detection processing.

16. A non-transitory computer readable medium that stores a program, wherein the program causes a computer to execute a method for controlling an electronic device comprising:

performing detection processing to detect approaching an object toward a finder;

performing instruction processing that can perform an image capturing preparation instruction including an instruction for performing distance measurement processing; and performing control processing, wherein in a case of a first state including a state of not receiving the image capturing preparation instruction performed by the instruction processing, displaying an image captured by an image pickup element but not displaying a first item indicating setting information related to image capturing and a second item indicating distance measurement information;

displaying 1) the second item at a position according to the distance measurement processing and 2) the first item, on the display, in response to receiving the image capturing preparation instruction performed by the instruction processing, and in the first state, displaying an indication of a focal distance of the image pickup element among the first item on the display together with displaying the captured image, in response to a new detection of an object approaching toward the finder in the detection processing.

\* \* \* \* \*